(No Model.) 4 Sheets—Sheet 1.
F. R. HILL.
BAND CUTTER AND FEEDER FOR THRASHING MACHINES.
No. 485,499. Patented Nov. 1, 1892.
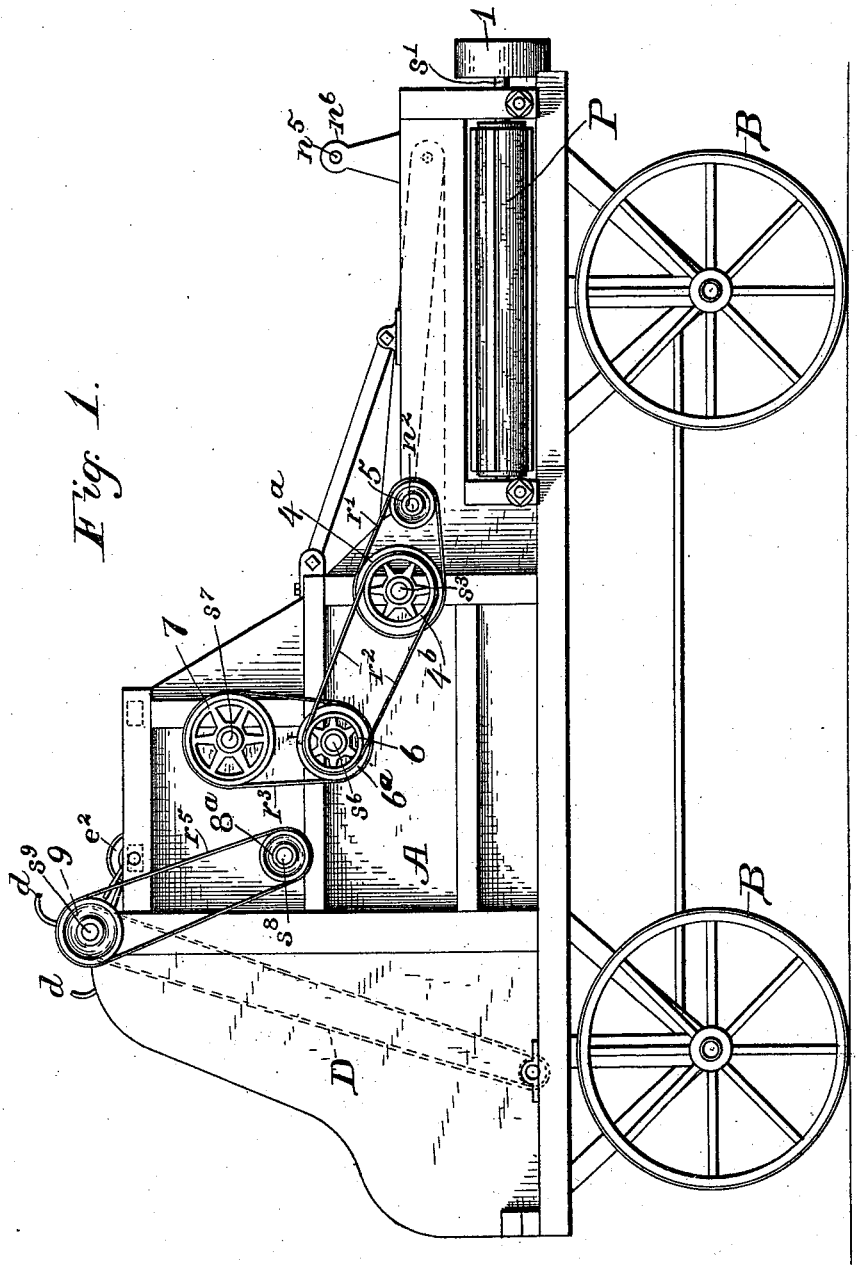
Witnesses
Inventor
Frank R. Hill,
by
Whitman & Wilkinson
Attorneys

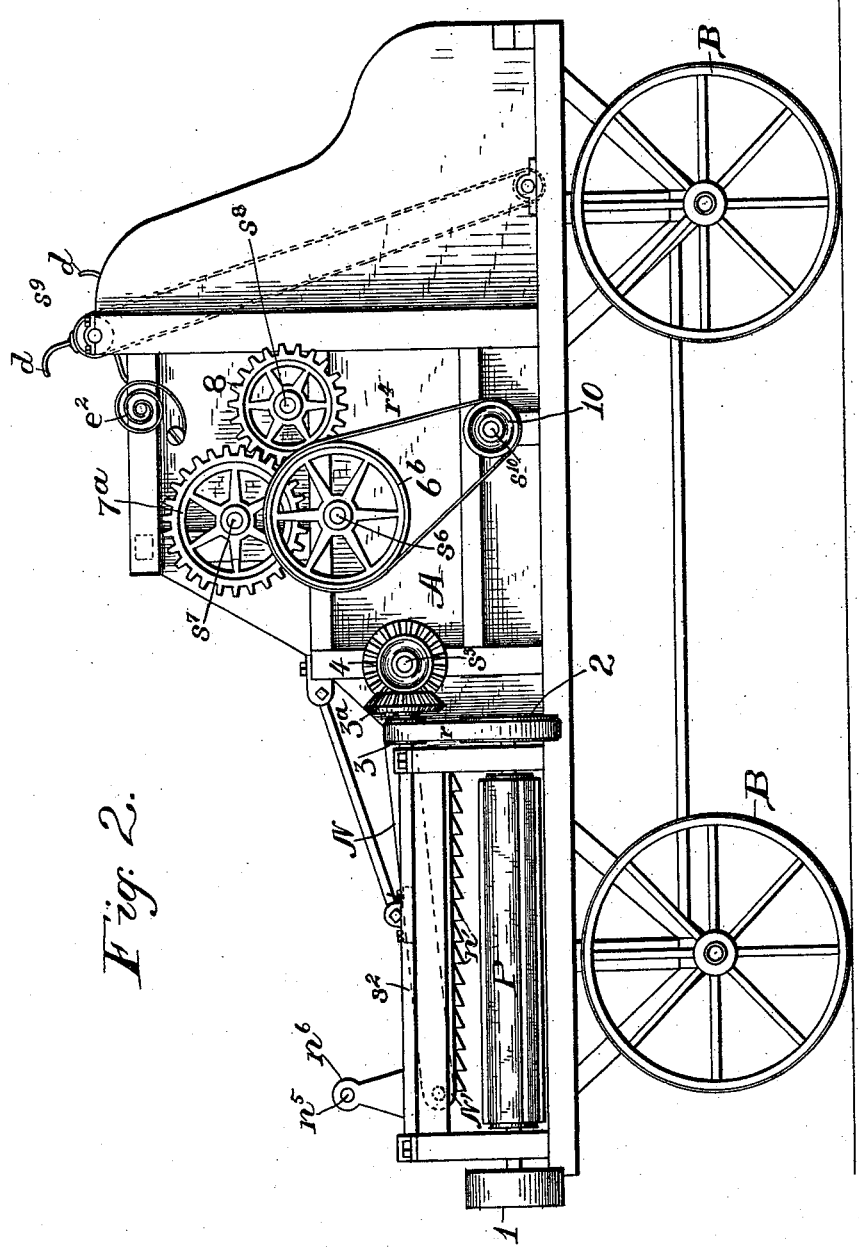

(No Model.) 4 Sheets—Sheet 3.
F. R. HILL.
BAND CUTTER AND FEEDER FOR THRASHING MACHINES.
No. 485,499. Patented Nov. 1, 1892.
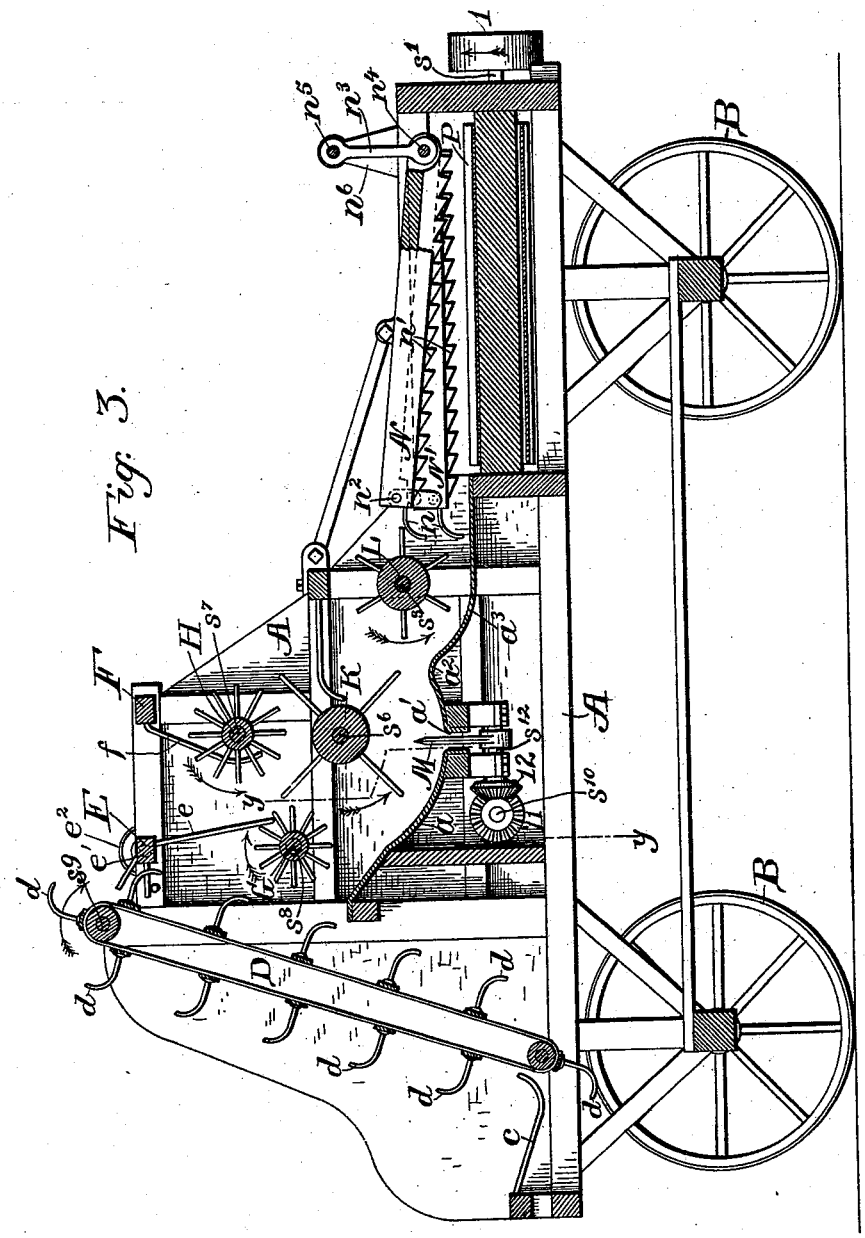

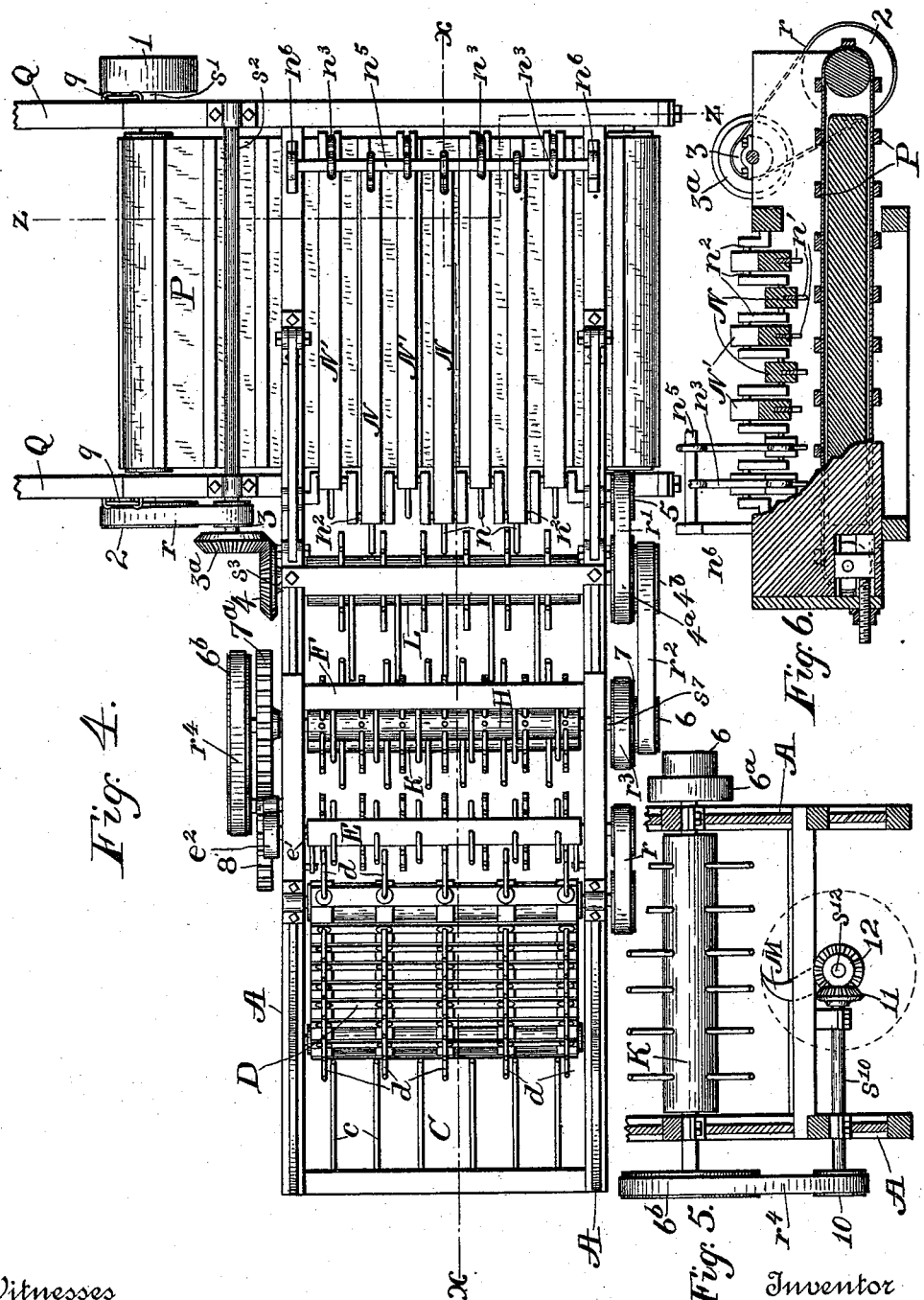

UNITED STATES PATENT OFFICE.

FRANK R. HILL, OF ROSS STATION, TEXAS.

BAND-CUTTER AND FEEDER FOR THRASHING-MACHINES.

SPECIFICATION forming part of Letters Patent No. 485,499, dated November 1, 1892.

Application filed May 23, 1892. Serial No. 433,997. (No model.)

*To all whom it may concern:*

Be it known that I, FRANK R. HILL, a citizen of the United States, residing at Ross Station, in the county of McLennan and State of Texas, have invented certain new and useful Improvements in Band-Cutters and Feeders for Thrashing-Machines; and I do hereby declare the following to be a full, clear, and exact description of the invention, such as will enable others skilled in the art to which it appertains to make and use the same.

My invention relates to band-cutters and feeders for thrashing-machines; and its object is to provide an attachment to thrashing-machines for cutting the bands on the sheaves of wheat, rice, or other grain, to spread the loosened bundles out uniformly, and to then feed them thus spread out into the thrashing-machine, whereby the strain on all the parts of the machine may be made more uniform and the capacity of the machine and the thoroughness of the thrashing may be greatly increased.

Reference is had to the accompanying drawings, wherein the same parts are indicated by the same letters and numerals in all the figures.

Figure 1 represents a side elevation of the band-cutting and feeding attachment to thrashing-machines, as seen from the right in Fig. 4. Fig. 2 represents a side elevation of the same, as seen from the left in Fig. 4. Fig. 3 represents a vertical section along the line $x\ x$ of Fig. 4. Fig. 4 represents a plan view of the device. Fig. 5 represents a section of a portion of the device along the line $y\ y$ of Fig. 3, looking toward the knife, for cutting the bands; and Fig. 6 represents a section made along the line $z\ z$ of Fig. 4, looking to the left.

A represents any suitable frame, which for convenience of transportation is preferably mounted upon wheels B and is adapted to be attached to a thrashing-machine.

C represents a rack preferably composed of iron bars $c$, curved so as to hold the sheaves of grain which are thrown thereon as they are brought in from the field.

D is a carrier having a number of parallel rows of hooks $d$, curved upward and adapted to pass between the curved bars $c$ and to pick up the sheaves therefrom.

E represents a beam mounted on trunnions or pivots $e'$ and carrying a number of bars $e$.

F represents a fixed beam carrying a number of curved bars $f$.

The contracted space between the bars $e$ and $f$ forms a throat through which all the sheaves must pass, and in order that the said sheaves may not jamb therein the bars $e$ are normally pressed forward by the spring $e^2$, which spring allows them to be pressed backward by the weight of one or more sheaves, allowing the sheaves to drop between the toothed rollers G and H into the spaces between the spokes of the roller K, by which they are carried over the revolving knife M, which passes through a slot $a'$ in the bottom $a$ of the framework A. This knife cuts the bands and the loosened sheaves are pushed forward over the projections $a^2$ by the toothed roller K into the curved passage $a^3$, where the toothed roller L pushes them beneath the hooks $n$ of the vibrating beams N' and N. These beams are vibrated by the crank-shaft $n^2$ and carry on their lower sides teeth $n'$, inclined as shown, for the purpose of spreading out the stalks evenly over the carrier P. The inner ends of these vibrating beams N and N' are suspended each by independent double eyebolts $n^3$ on the axle $n^5$, a pin $n^4$ serving as a pivot in each beam. The axle or shaft $n^5$ is supported on stanchions $n^6$, secured to the framework A. The carrier P is connected to the thrashing-machine Q (indicated in Fig. 4) in any suitable way, as by hooks $q$.

Motion is transmitted to the various parts from the engine in any convenient way. I have shown a driving-pulley 1, receiving its power from the engine, (not shown,) which is mounted on the same shaft $s'$ with the pulley 2. This shaft $s'$ drives the carrier P and pulley 2; and the said pulley 2 is connected by the belt $r$ to the pulley 3 on the shaft $s^2$. This shaft also carries a miter-wheel $3^a$, meshing with the miter-wheel 4 on the shaft $s^3$. At the opposite end of this shaft the pulley $4^a$ drives the pulley 5 and crank-shaft $n^2$ by means of the belt $r'$, and the pulley $4^b$ drives the shaft $s^6$ by means of the belt $r^2$ and pulley 6. On this shaft $s^6$ the pulley $6^a$ drives the pulley 7 by means of the belt $r^3$, and on the opposite end of the shaft $s^6$ the pulley $6^b$ and belt $r^4$ drive the pulley 10 on the shaft $s^{10}$, which shaft carries the miter-wheel 11, meshing in the miter-wheel 12 on the shaft $s^{12}$, on which shaft the revolving knife M is secured.

On the opposite end of the shaft $s^7$ from the pulley 7 the cog-wheel $7^a$ is placed. This cog-wheel meshes in the cog-wheel 8 on the shaft $s^8$, which carries at its other end the pulley $8^a$, which drives the pulley 9 on the shaft $s^9$ by means of the belt $r^5$. This shaft $s^9$ drives the carrier D. The various parts move in the directions shown by the arrows in Fig. 3.

The operation of the device is as follows: The grain is thrown from the wagons or shocks in sheaves upon the rack $c$, from whence the sheaves are carried by the curved hooks $d$ of the carrier D and fall between the beams E and F. Passing between the bars $e$ and $f$ and carried forward by the teeth of the rollers G and H and of the roller K, they pass over the revolving knife M, where the bands are cut, and the loosened sheaves are pushed onward under the toothed roller L and the vibrating beams N and N'. The hooks $n$ and teeth $n'$, attached to these vibrating beams, engage the straw and spread it evenly over the carrier P, by which it is carried in a uniform layer into the thrashing-machine. By having a uniform layer of straw entering the said thrashing-machine the possibility of choking the machine is decreased and the work is distributed more uniformly over the operative parts of the thrashing-machine, thereby rendering accidents less liable and insuring the more perfect thrashing out of the grain. In this way it will be seen that the machine will accomplish a great deal of work now most commonly done by hand, and the use of my device will do away with the necessity for the services of at least four men.

Having thus described my invention, what I claim, and desire to secure by Letters Patent of the United States, is—

1. In a machine of the character described, a device for feeding and distributing the unthrashed straw onto a feed-carrier, consisting of a plurality of beams N and N', placed nearly horizontal over said carrier and carrying teeth $n'$ on their lower sides, the said teeth sloping, as shown, the said beams being each suspended at one end and connected at the other end to a crank-pin on a revolving crank-shaft, whereby the said beams are given an up-and-down and a horizontal motion, substantially as and for the purposes described.

2. In a band-cutter and feeder for thrashing-machines, the combination, with the framework A, having the bed $a$, with the slot $a'$ made transversely therein, of the toothed rollers K and L, pushing the sheaves transversely over said slotted bed, and means for feeding said sheaves to said toothed rollers, a knife for cutting the bands, revolving in said slot, and a carrier leading to the thrashing-machine, with means for spreading the loosened sheaves on said carrier, substantially as described.

3. In a band-cutter and feeder for thrashing-machines, the combination, with the framework A, having the bed $a$, with the slot $a'$ made transversely therein, of a plurality of toothed rollers G, H, K, and L for guiding the sheaves and carrying them transversely over said slotted bed and means for feeding said sheaves to said toothed rollers, a knife for cutting the bands, revolving in said slot, and a feed-carrier leading to the thrashing-machine, with means for spreading the loosened sheaves on said carrier, substantially as described.

4. In a band-cutter and feeder for thrashing-machines, the combination, with the framework A, having the bed $a$, with the slot $a'$ made transversely therein, of a carrier D and toothed rollers G, H, K, and L for guiding said sheaves, carrying them transversely over said slot, and pushing them onto a feed-carrier leading to the thrashing-machine, and a revolving knife passing upward through said slot and cutting the bands from said sheaves as they pass over said slot, substantially as and for the purposes described.

5. In a band-cutter and feeder for thrashing-machines, the combination, with the framework A, having the fixed cross-beam F, carrying the curved bars $f$, and the pivoted cross-beam E, carrying the bars $e$ and the spring $e^2$, and the bed $a$, with the slot $a'$ made transversely therein, of a plurality of toothed rollers G, H, K, and L for guiding the sheaves and carrying them transversely over said slotted bed, and means for feeding said sheaves to said toothed rollers, a knife for cutting the bands, revolving in said slot, and a carrier leading to the thrashing-machine, with means for spreading the loosened sheaves on said carrier, substantially as described.

6. In a band-cutter and feeder for thrashing-machines, the combination, with the framework A, having the fixed cross-beam F, carrying the curved bars $f$, and the pivoted cross-beam E, carrying the bars $e$ and the spring $e^2$, and the bed $a$, with the slot $a'$ made transversely therein, of a carrier D and toothed rollers G, H, K, and L for guiding said sheaves, carrying them transversely over said slot and pushing them on a feed-carrier leading to the thrashing-machine, and a revolving knife passing upward through said slot and cutting the bands from said sheaves as they pass over said slot, substantially as and for the purposes described.

In testimony whereof I affix my signature in presence of two witnesses.

FRANK R. HILL.

Witnesses:
C. S. BARBER,
S. E. ECHOLS.